A. T. KASLEY.
GOVERNOR.
APPLICATION FILED OCT. 7, 1914.
1,231,261.
Patented June 26, 1917.
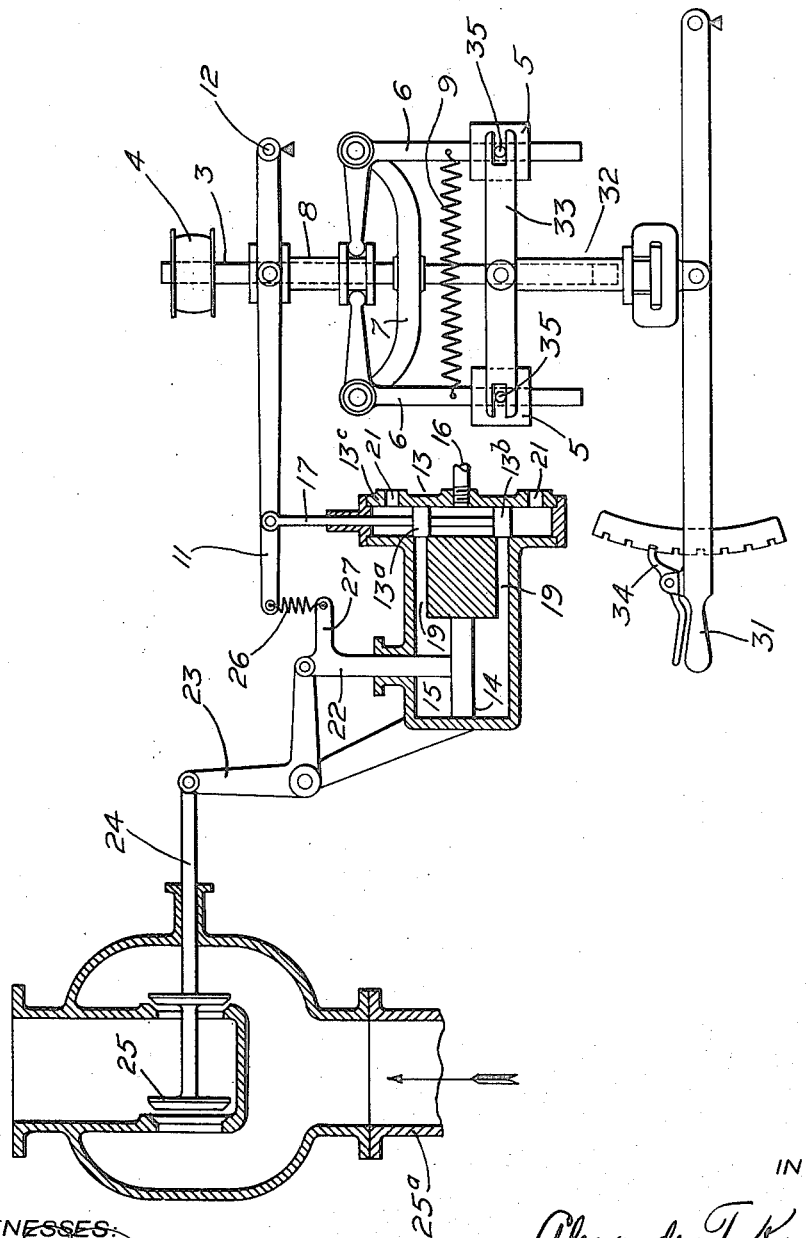
WITNESSES:
INVENTOR.
Alexander T. Kasley
BY
HIS ATTORNEY IN FACT

UNITED STATES PATENT OFFICE.

ALEXANDER T. KASLEY, OF SWISSVALE, PENNSYLVANIA, ASSIGNOR TO THE WESTINGHOUSE MACHINE COMPANY, A CORPORATION OF PENNSYLVANIA.

GOVERNOR.

1,231,261.  Specification of Letters Patent.  Patented June 26, 1917.

Application filed October 7, 1914. Serial No. 865,545.

*To all whom it may concern:*

Be it known that I, ALEXANDER T. KASLEY, a citizen of the United States, and a resident of Swissvale, in the county of Allegheny and State of Pennsylvania, have made a new and useful Invention in Governors, of which the following is a specification.

An object of this invention is to produce a highly efficient and effective governor mechanism which is cheaper to build and is of simpler construction than governor mechanisms of equal power and sensitiveness now in use and known to me.

A further object is to produce a governor mechanism in which means are employed for varying the counterbalancing force of the speed responsive means in proportion to the varying results attained by the governor mechanism.

A further object is to produce a governor mechanism in which means are employed for decreasing the amplitude of the motion of the centrifugal weights or speed responsive agent employed.

A further object is to produce a governor mechanism in which means are employed for maintaining the governor weights or speed responsive agent at substantially the same distance from the axis of rotation for all varying loads and speeds of the governed apparatus.

A further and more specific object is to produce a variable speed governor mechanism of approximately equal strength for all speeds within its range and in which means are employed for eliminating heavy thrusts on the thrust collar and for reducing the maximum strain on the counterbalancing spring of the governor weights or speed responsive agent employed.

These and other objects, which will be made apparent throughout the further description of the invention, are attained by means of a governor mechanism embodying the features herein described and illustrated in the single sheet drawing accompanying and forming a part of this application.

In the drawing I have illustrated diagrammatically and partially in section a governing mechanism embodying my invention.

The apparatus illustrated includes a rotatable spindle 3, which is adapted to be driven by the apparatus to be governed, through the agency of any suitable means, such for example, as the pulley 4. Centrifugal weights 5 are mounted on bell cranks 6, which are journaled on a bracket 7, rigidly mounted on the spindle 3, and are adapted to engage a sleeve 8, surrounding the governor spindle 3, and move it longitudinally of the spindle, in response to variations in the positions of the weights with relation to their axis of rotation. As illustrated, centrifugal action of the weights is opposed by a coiled spring 9, which is secured to the two bell cranks 6 in such a manner as to tend to move the weights inwardly toward the spindle 3.

The sleeve 8 is connected in any suitable manner, such for example as shown, to a lever 11, so that it is capable of moving the lever about its fulcrum point 12 in response to variations in the positions of the weights 5. As illustrated, the lever 11 is adapted to actuate a relay valve 13 and to thereby control the operation of a piston 14, which is located in a cylinder 15. Any suitable relay valve may be employed and, as illustrated, the valve 13 is capable of controlling the delivery of fluid under pressure from a supply pipe or passage 16 to one end or the other of the cylinder 15, and of also controlling the exhaust of fluid from one end or other of the cylinder 15, and consists of a valve proper, having two port controlling portions $13^a$ and $13^b$, which are mounted on a valve stem 17 and are inclosed within a casing $13^c$. Each port controlling portion of the valve is adapted to control the delivery of fluid under pressure through a separate port 19, with which the casing $13^c$ is provided. One of the ports 19 communicates with the upper end while the other communicates with the lower end of the cylinder 15. The fluid supply pipe or port 16 is located at an intermediate point of the casing $13^c$, so that it delivers fluid to the casing at a point between the port controlling portions $13^a$ and $13^b$, while the casing is provided with two exhaust ports 21, which are located at opposite ends of the casing and beyond the portions $13^a$ and $13^b$. With such an arrangement, motion of the relay valve will place one of the ports 19 in communication with the supply pipe 16, and the other in communication with one of the exhaust ports 21, so that fluid under pressure will be delivered to one end of the cylinder 15, while the other end of the cylinder is open to exhaust. This will cause the piston 14 to move in response to the preponderance of fluid pressure in one end over that existing in the other end of the cylinder 15. The piston rod 22 is shown connected by means of a bell crank 23 to the valve stem 24 of an admission valve 25, which is capable of controlling the delivery of motive fluid to the apparatus to be governed. And the arrangement is such that as the balls 5 of the governor move outwardly in response to an increase in speed of the governed apparatus, the valve 25 will move to restrict the flow of motive fluid through the delivery main 25ª, and vice versa, as the balls move inwardly in response to a decrease in speed of the governed apparatus, the valve 25 will move to increase the delivery of motive fluid through the main 25ª.

With an arrangement of the apparatus described, the valve 25 would be either fully opened or fully closed by each change in position of the governor balls 5. This, however, is obviated by providing means responsive to the variations in the position of the piston 14 for varying the counterbalancing force on the balls 5, or for returning them to substantially their normal operative position after the governing mechanism is operated in response to a variation in speed or a change in load on the apparatus to be governed. As illustrated, I have provided a compression spring 26 between the free end of the lever 11 and a lug or lateral extension 27, provided on the piston rod 22. The spring 26 is preferably so connected to the lever and the lug that it is capable of operating either as a compression or a tension spring.

The operation of the apparatus described is as follows: As the load on the engine or apparatus to be governed diminishes and the speed of the apparatus consequently increases, the governor balls move outwardly and through the agency of the sleeve 8 shift the position of the lever 11, and thereby move the relay valve 13 to admit fluid under pressure to the lower end of the cylinder 15, and to place the upper end of the cylinder in communication with the exhaust. The piston 14 moving in response to the fluid pressure admitted to the cylinder closes the valve 25 more or less and at the same time compresses the spring 26 to such an extent that it finally shifts the position of the lever 11 to its normal or intermediate position, in which the relay valve closes both the ports 19 and cuts off the delivery of fluid to the cylinder 15 and also communication between the cylinder and the exhaust. The movement of the lever 11 in response to the pressure exerted on it by the spring 26 is transmitted to the governor balls through the agency of the sleeve 8 and their mounting bell cranks 6, and the balls are consequently returned to substantially their normal operative position.

An increase in load on the engine or apparatus to be governed will occasion a reduction in speed, and consequently the governor balls will move inwardly in response to the pull of the spring 9, which is augmented by the thrust of the spring 26. This motion of the balls shifts the position of the lever 11 and, through the agency of the relay valve, delivers fluid under pressure to the upper end of the cylinder 15, while the lower end of the cylinder is placed in communication with the exhaust. The piston 14 therefore moves downwardly, opening the valve 25 more or less and also reducing the counterbalancing force on the balls 5 by reducing the pressure on the spring 26. Consequently the balls 5 are capable of returning to their normal operative position in response to the centrifugal force since their counterbalancing force is diminished. This motion of the balls returns the lever 11 to its normal operative position, in which the relay valve closes communication between the cylinder 15 and the fluid admission pipe 16, as well as between the cylinder 15 and the exhaust ports 21. If, now, the load on the engine further increases, occasioning a further diminution in the speed, the balls 5 will again move inwardly in response to the decreasing centrifugal force and will again shift the position of the lever 11, so as to admit fluid under pressure to the upper end of the cylinder. This will occasion a further opening of the valve 25 and a further diminution of the counterbalancing force on the balls 5, so that the balls will again move to their normal position and will again shift the lever 11 to its normal position. An increase in speed of the apparatus to be governed, and a consequent increase in speed will occasion an outward movement of the balls, which will shift the position of the relay 13 to close the valve 25 more or less. The closing movement thus imparted to the piston 14 will also operate on the spring 26 to increase the counterbalancing force on the balls 5 and will, as previously described, return the balls to substantially their normal position. With this arrangement, the spring 9 may be made lighter, since its range of action is materially decreased below that of counterbalancing springs employed on ordinary governors, and consequently the governor will respond more readily to variations in load, whether the apparatus to be governed is operating under heavy or light load.

In the apparatus illustrated I have provided improved means for varying the effective operation of the governing mechanism so as to vary the speed of the governed apparatus as desired.

The means illustrated consists of a lever 31, which is adapted through the agency of a sleeve 32 and a yoke 33, to vary the positions of the weights 5 along their mounting arms 6, so as to vary the effect of the centrifugal force, occasioned by the rotation of the weights, in accordance with variations in the position of the weights relatively to the fulcrum points of the mounting arms 6.

The sleeve 32 is shown loosely mounted on the spindle 3 of the governor and capable of being moved longitudinally of the spindle by means of the lever 31, which as illustrated, is provided with a ratchet engaging pawl 34 for locking it in various positions. The yoke 33 is slotted at each end, so as to engage pins 35 carried by the weights, which are loosely mounted on their supporting arms 6. With this arrangement the yoke 33 and the sleeve 32 will rotate with the weights 5 and will be capable of varying the position of the weights in response to variations in the position of the sleeve 31. By moving the weights away from the fulcrum point of the bell cranks 6, their leverage is increased and consequently the effect of the centrifugal force is increased, and vice versa, when the weights are moved toward the fulcrum point the power arms of the bell crank levers 6 are decreased in effective length and consequently the effectiveness of the centrifugal force is reduced.

The speed of the governed device can therefore be varied at will by merely shifting the position of the weights along their supporting bell cranks.

Another feature of my invention is that the thrust imparted to the governor or thrust collar by the weights 5 is materially reduced below that encountered in ordinary governors. This is accomplished by so locating the relay valve that the normal position of the weight supporting arm of each bell crank 6 is parallel to the spindle 3. With such an arrangement there is no component of the centrifugal force, which causes thrust on the collar of the sleeve 32, and the sleeve 32 therefore merely supports the weight of the parts, which in a high speed governor is very small.

While I have illustrated one embodiment of my invention, and have described the principles of operation thereof, it will be apparent to those skilled in the art that various changes, modifications, substitutions, additions and omissions may be made in the apparatus illustrated without departing from the spirit and scope of the invention as set forth by the appended claims.

What I claim is:

1. In a governing mechanism, speed responsive means movable to different positions in response to variations in the speed of the governed apparatus, a mechanism for controlling the operation of the governed apparatus, a relay actuated by the speed responsive means, a piston controlled by the relay for controlling the operation of said mechanism, and means operating in response to the operation of said piston for moving said speed responsive means back to its initial operative position.

2. In a governing mechanism, a centrifugal weight driven by the governed apparatus and movable toward and away from its axis of rotation in response to variations in the speed of rotation thereof, a mechanism for controlling the operation of the governed apparatus, means controlled by the centrifugal action of the weight for controlling the operation of said mechanism, and a device controlled by said means for varying the centripetal force exerted on said weight, in response to the operation of said means, and after said weight has moved in response to a variation in speed.

3. In a governing mechanism, a centrifugal weight driven by the governed apparatus and movable toward and away from its axis of rotation in response to variations in the speed of rotation thereof, a mechanism for controlling the operation of the governed apparatus, means controlled by the centrifugal action of the weight for controlling the operation of said mechanism, and a spring controlled by said means for varying the centripetal force exerted on said weight in response to the operation of said means, and after said weight has moved in response to a variation in speed.

4. In a governing mechanism, speed responsive means movable to different positions in response to variations in the speed of the apparatus to be governed, means controlled thereby but acting more slowly than the speed responsive means, for controlling the operation of the governed apparatus, and means controlled by the operation of said controlled means for returning said centrifugally controlled means to substantially its normal operative position, after it has moved therefrom in response to a variation in speed of the governed apparatus.

5. In a governing mechanism, centrifugally controlled means movable in response to variations in the speed of the governed apparatus, means controlled by the centrifugal action of said centrifugally controlled means for controlling the operation of the governed apparatus, and means controlled by said last mentioned means for varying the centripetal force exerted on said centrifugally controlled means after each movement of the centrifugally controlled means in response to a variation of the speed of the governed apparatus.

6. In a governing mechanism, speed responsive means, movable to different positions in response to variations in speed of the apparatus to be governed, means for controlling the operation of the apparatus to be governed, a relay actuated by the speed responsive means, and a piston controlled by the relay for controlling the operation of said means and for moving said speed responsive means back to its initial position in moving in response to the control of the relay.

7. In a governing mechanism, a centrifugal weight movable to different positions in response to variations in the speed of the apparatus to be governed, means for yieldingly resisting the centrifugal pull of the weight, means for controlling the operation of the apparatus to be governed, a piston for controlling the operation of said controlling means, a relay actuated by said weight for controlling the operation of said piston, and means controlled by the piston for varying the counterbalancing load of the weight in response to movements of the piston under the control of said relay.

8. In a governing mechanism, a centrifugal weight, movable to different positions in response to variations in the speed of the apparatus to be governed, a spring for yieldingly resisting the centrifugal pull of the weight, means for controlling the operation of the apparatus to be governed, a lever actuated by variations in the position of the weight, a relay actuated by the lever, and a piston yieldingly connected to said lever and controlled by said relay to actuate said controlling means and to move said lever, said relay and said weight to initial operative positions in moving in response to the control of the relay.

In testimony whereof, I have hereunto subscribed my name this 5th day of October, 1914.

ALEXANDER T. KASLEY.

Witnesses:
C. W. McGHEE,
E. W. McCALLISTER.